United States Patent
Fehrenbach et al.

(10) Patent No.: US 7,322,233 B2
(45) Date of Patent: Jan. 29, 2008

(54) LEVEL METER WITH A WAVEGUIDE AND A WAVE ADAPTER

(75) Inventors: Josef Fehrenbach, Haslach i. K (DE); Juergen Motzer, Gengenbach (DE); Juergen Dietmeier, Hausach (DE); Klaus Kienzle, Zell a. H. (DE); Johannes Falk, St. Georgen (DE)

(73) Assignee: Vega Grieshaber KG, Wolfach (DE)

( * ) Notice: Subject to any disclaimer, the term of this patent is extended or adjusted under 35 U.S.C. 154(b) by 25 days.

(21) Appl. No.: 11/179,783

(22) Filed: Jul. 13, 2005

(65) Prior Publication Data
US 2006/0033506 A1 Feb. 16, 2006

(30) Foreign Application Priority Data
Jul. 14, 2004 (DE) .............. 10 2004 034 251

(51) Int. Cl.
*G01F 23/28* (2006.01)
(52) U.S. Cl. .................... 73/290 V; 73/290 R
(58) Field of Classification Search .......... 73/290 V, 73/290 R; 343/772, 703
See application file for complete search history.

(56) References Cited

U.S. PATENT DOCUMENTS

| | | | | |
|---|---|---|---|---|
| 3,001,160 | A * | 9/1961 | Trousdale | 333/252 |
| 3,205,500 | A * | 9/1965 | Hull et al. | 343/756 |
| 5,877,663 | A * | 3/1999 | Palan et al. | 333/252 |
| 5,926,080 | A * | 7/1999 | Palan et al. | 333/252 |
| 6,081,632 | A * | 6/2000 | Yoshimura et al. | 385/5 |
| 6,202,485 | B1 * | 3/2001 | Wien et al. | 73/290 R |
| 6,401,532 | B2 * | 6/2002 | Lubbers | 73/290 R |
| 6,417,748 | B1 * | 7/2002 | Lopatin et al. | 333/252 |
| 6,499,346 | B1 * | 12/2002 | Wien et al. | 73/290 R |
| 6,619,117 | B1 * | 9/2003 | Reimelt | 73/219 |
| 6,779,397 | B2 * | 8/2004 | Burger et al. | 73/290 V |
| 6,847,214 | B2 * | 1/2005 | Reimelt et al. | 324/644 |
| 7,068,213 | B2 * | 6/2006 | Muller et al. | 342/124 |
| 7,102,584 | B2 * | 9/2006 | Janitch et al. | 343/785 |

(Continued)

FOREIGN PATENT DOCUMENTS

DE 44 43 055 6/1996

(Continued)

*Primary Examiner*—Hezron Williams
*Assistant Examiner*—Rodney Frank
(74) *Attorney, Agent, or Firm*—The Nath Law Group; Jerald L. Meyer; Matthew J. Moffa

(57) ABSTRACT

The invention relates to a level meter with a waveguide for guiding an electromagnetic wave, such that the waveguide is designed as a hollow conductor and has a forward terminal section; with a wave adapter of a dielectrical material, such that the wave adapter has an outer circumferential area and partially projects with this outer circumferential area into a hole in the terminal section of the waveguide and partially protrudes from this terminal section, and such that the wave adapter has dimensions that allow it to adapt the wave transition of a wave leaving or entering the terminal section of the waveguide; and with a metallic transitional material in an area between the wave adapter and the waveguide, such that the transitional material assumes the form of a metallized part that extends over an area greater than area of direct contact between the outer circumference of the wave adapter and the waveguide.

12 Claims, 1 Drawing Sheet

U.S. PATENT DOCUMENTS

Figure 1:
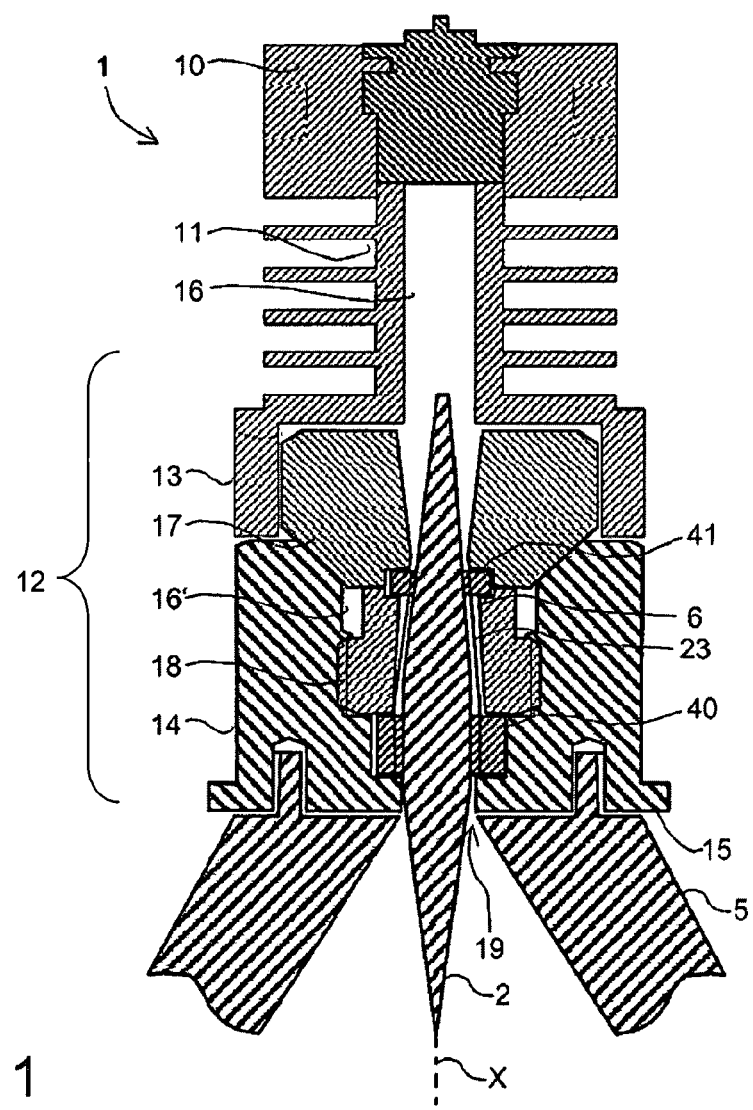

2004/0017200 A1* 1/2004 Reimelt et al. ............. 324/439
2004/0069775 A1* 4/2004 Delmotte et al. ........... 219/679

FOREIGN PATENT DOCUMENTS

| | | |
|---|---|---|
| DE | 297 21 906 | 4/1998 |
| DE | 199 50 429 | 4/2001 |
| EP | 1 396 710 | 3/2004 |
| WO | 97/12211 A1 | 4/1997 |

\* cited by examiner

LEVEL METER WITH A WAVEGUIDE AND A WAVE ADAPTER

The invention relates to a level meter with a waveguide and a wave adapter; it also relates to a wave adapted for this level meter.

In measuring the level within containers, measuring devices are known which generate a microwave or radar signal and transmit it toward the surface of the medium held by the container. A wave reflected by the surface is received by the level meter, and the interval of time between transmission and reception of the wave is ascertained. From this interval of time it is possible to determine the distance between the level meter and the surface of the medium, and thus to determine the container's level of fill.

A typical level meter consists of a waveguide for conducting an electromagnetic wave. Here the waveguide takes the form of a hollow tube and exhibits a terminal section from which the wave is emitted by an antenna. Fitted to the transitional area between the waveguide and open space, or the antenna, is a wave adapter, which has an adjusted outer circumference and consists of a dielectrical material. Here the wave adapter partly projects into the terminal section of the waveguide and partly protrudes from it, in order to adapt a wave's transition out of or into the terminal section of the waveguide. It is also known to secure the wave adapter into or onto the waveguide by means of a solder ring, such that the vicinity of the soldering point on the conical wave adapter is previously metallized, in order to solder the solder ring to the wave adapter. Such metal solder rings, in conjunction with graphite sealing rings, particularly serve the purpose of sealing the device against the process underway in the container interior, as well as the purpose of providing pressure support to compensate for the expansion of metal parts when there are high temperature differences between the level meter components and the container interior.

In fastening the wave adapter a metallic clamping or pressure screw is customarily used in order to secure the wave adapter in the housing or onto the hollow conductor. An air gap usually arises between the outer circumference of the wave adapter and the inner circumference of the housing, or the hollow conductor; this air gap is due is due to ever-present manufacturing tolerances. Waves running through the hollow conductor to the wave adapter consequently arise not only at the points of direct contact between the wave adapter and the hollow conductor, or housing, but also across the air gap. The result is that there is a doubled wave transition. This leads to disruptive signal components.

The goal of the invention is to propose a level meter in which the disruptive effect of an air gap between the wave adapter and the waveguide is reduced or eliminated.

This goal is achieved by a level meter and by a wave adapted exhibiting the features of the present claims.

A level meter is accordingly preferred with a waveguide for guiding an electromagnetic wave, such that the waveguide is designed as a hollow conductor and exhibits a forward terminal section; with a wave adapter of a dielectrical material, where the wave adapter has an outer circumferential area and partially projects with this outer circumferential area into a hole in the terminal section of the waveguide and partially protrudes from this terminal section, and where the wave adapter has dimensions that allow it to adapt the wave transition of a wave leaving or entering the terminal section of the waveguide; and with a metallic transitional material in an area between the wave adapter and the waveguide, such that the transitional material assumes the form of a metallized part that extends over an area greater than area of direct contact between the outer circumference of the wave adapter and the waveguide.

Of independent significance is a wave adaptor, specifically for this kind of level meter, consisting of a dielectrical material, for adapting a wave in the transitional area between a waveguide and a bordering space and/or bordering body, where it is to be emphasized that the metallized part extends beyond the area of direct contact with the waveguide.

Advantageous embodiments are the subject matter of dependent claims.

Particularly preferred is a level meter in which the metallized part covering the outer circumference of the wave adapter reaches a certain distance into the area of the waveguide Particularly preferred is a level meter in which the metallized part covering the outer circumference of the wave adapter reaches into the waveguide up to a terminal section of the wave adapter that is unmetallized.

Particularly preferred is a level meter in which the wave adapter passing into the waveguide has a conical shape.

Particularly preferred is level meter in which a section of the wave adapter projecting from the terminal section of the waveguide projects into an antenna, particularly a horn antenna.

Particularly preferred is a level meter in which the metallized portion extends in the direction of wave propagation and along the wave adapter a distance such that the electromagnetic wave proceeding from the waveguide or from the wave adapter cannot penetrate into a gap between the wave adapter and the waveguide and into the contact area, or into the area adjacent thereto.

Particularly preferred is a level meter in which an electromagnetically conductive contact ring is positioned in the contact area between the metallized wave adapter and the waveguide, such that the contact ring is soldered to the metallized part.

Particularly preferred is a level meter in which an electromagnetically conductive contact ring is positioned in the terminal area between the metallized wave adapter and the waveguide.

Particularly preferred is a level meter in which the contact ring made of a work material containing metal or graphite.

Particularly preferred is a level meter in which the wave adapter has a cylindrical outer diameter in the area beneath the contact ring.

Particularly preferred is a level meter in which the waveguide is formed by a hollow conductor and by a housing that is positioned in front of it, in order to attach an antenna and/or to secure the configuration in the hole of the container wall, where the wave adapter projects at least partly from the housing area on both side.

Figure 2:
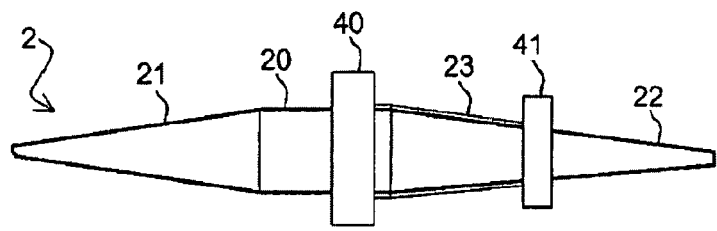

An exemplary embodiment is next described in detail, as based on the drawing. Shown are:

FIG. 1 a section view through a level meter according to a preferred exemplary embodiment FIG. 2 an enlarged view of a wave adapter from FIG. 1

Figure 3:
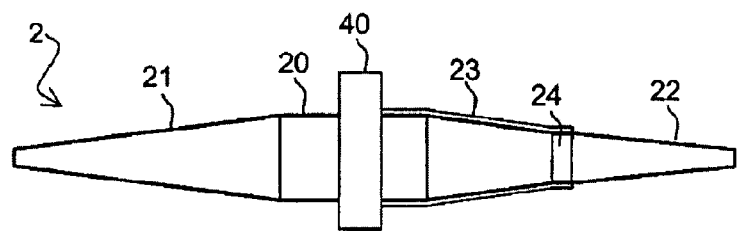

FIG. 3 an alternative embodiment of the wave adapter.

FIG. 1 schematically depicts an exemplary level meter. With regard to its important aspects, the level meter consists of a waveguide 1 for conducting an electromagnetic wave, and a wave adapter 2, which is installed in the front of the waveguide 1 for the purpose of adapting the wave in its transition from the waveguide into an adjacent body or space.

In particular, the waveguide 1 is designed as a hollow conductor 11, with a central hole 16 running through the waveguide in the axial direction.

In accordance with a particularly preferred embodiment the hole 16 is not filled with a solid medium, although this would be possible in principle. At the back the waveguide 1 exhibits a reception area for the installation of conventional components, particularly an electronic unit 10 for generating an electromagnetic wave. The electromagnetic wave is coupled into the hollow conductor and is transmitted by it in the forward direction. In addition, electromagnetic waves introduced by the electronic component are received by the hollow conductor 11 and are processed, in order to ultimately reach a conclusion about the level of fill in the container in which the level meter is installed on the basis of the difference in operating times between the transmitted and received wave. The waves in question are microwaves or radar waves.

The front of the waveguide 1 exhibits a front terminal section 12 with a face 15, such that the axial hole 16 runs from the rear electronics part 10 up to the face 15. In the depicted exemplary embodiment the front terminal section 12 of the waveguide 1 consists of two components 13, 14, which form a kind of housing for the various other components it contains. The various components disclosed herein have a known design and arrangement, and can be exchanged for different but comparable components.

The front terminal section 12 exhibits an enlarged hole 16, in which the wave adapter 2 is installed. The wave adapter 2 is made of a dielectrical, particularly ceramic, material and serves to adapt the wave transition of the electromagnetic wave advanced from the hollow guide 11 to the front terminal section 12 (which is enlarged with respect to diameter and wall thickness) and/or antenna 5, which is mounted on face 15. The antenna 5 is designed, e.g., as a horn antenna or a parabolic antenna. As an alternative, another waveguide with other physical dimensions with respect to wave guidance can also be mounted on the forward face, so that adjustment of the wave transition is required.

The wave adapter 2 depicted in enlarged form in FIG. 2 and (in an alternative variant) in FIG. 3 exhibits a central section 20 with a basically cylindrical form. In the backwards and forwards directions the cylindrical section 20 passes into a conical rear and forward section 22, 21. Other wave adapter forms are known, depending on the wave transition being adapted.

To secure the wave adapter 2 within the front terminal section 12 of the waveguide 1 the wave adapter 2 is inserted with its rear terminal section 22 into the hole 16 in the rear terminal section of the front end of the waveguide 1. Then the front terminal section 12 is positioned over above the front terminal section 21 of the wave adapter 2 and secured, particularly screwed, to the rear terminal section 13. Inasmuch as the front through-hole in the front terminal section 12 has a smaller diameter than the cylindrical section 20 of the wave adapter 2, the wave adapter 2 is held in position by the housing formed by the front terminal section 12, and is braced within the hole 16 in the waveguide 1; the hole 16 has a smaller diameter than the cylindrical section 20 of the wave adapter 2. In the depicted embodiment a plurality of additional components serves to improve the mounting and bracing of the wave adapter 2 in the waveguide 1. In the process, the back section 22 of the wave adapter 2 runs through two other components 17, 18, which are positioned in the hole 16' of the housing 12 or, as the case may be, of the front terminal section 12. The hole 16 runs through these two other components 17, 18 as a borehole. As can be seen from the schematic sketch, the hole 16 in the area between the rear inner wall of component 17 and the outside wall of the rear and conically tapering back section 22 of the wave adapter 2 is such that a gap 6 is formed between the two. A wave transmitted from the rear runs from the hollow guide 11 into the back section 22 of the wave adapter and through it. Moreover, the wave coming from the hollow guide 11 could continue through the area of the housing, pass over the gap 6, and penetrate the wave adapter with a corresponding two-fold wave transition. This would result in known disruptions in the radiated wave.

To avoid the penetration of the wave from a lateral direction across the gap 6 into the wave adapter 2, the wave adapter 2 exhibits an external metal layer or metallized part 23. As an alternative the metallized part can be a narrow metallic sleeve. The metallized part 23 prevents a wave transition in the lateral direction across the gap 6 into the waveguide 1 and thus prevents the two-fold wave transition in the area of the gap 6. Also prevented is a wave transition from the waveguide 1 across the gap 6 into the wave adapter 2.

As can be seen particularly from FIGS. 2 and 3, the metallized part 23 of the wave adapter 2 starts at the central section of the wave adapter and moves towards the back. The metallized part 23 extends towards the back to a point such that a secure contact is made possible, as is a good bridging of the area with the gap 6, up to a desired point of contact.

To improve the mechanical and/or electromagnetic coupling of the wave adapter 2 in the waveguide 1, or in its front terminal section 12, a contact ring is mounted on the wave adapter 2 in the vicinity of its central cylindrical section 20. This contact ring 40 can be welded to the metallized part 23 in a simple manner. According to a particularly preferred embodiment, another contact ring 41 is attached in comparable fashion to the wave adapter in the vicinity of the back end of the metallized part 23. The front contact ring 40 serves as an abutment for the front terminal section 14 of the waveguide 1. The back contact ring serves as the rear abutment in bracing the wave adapter 2 against a rear stop formed in the waveguide 1; the rear stop is formed by one of the depicted components 17. The contact rings 40, 41 may be omitted, however.

FIG. 3 shows an embodiment in which the wave adapter 2 exhibits a cylindrical section 24 designed as a contact in its rear section 22. A rear contact ring 41 can be attached with special success to this kind of cylindrical section 24 in order to form a contact.

Because of the metallized part, electromagnetic waves are retained in the ceramic material of the wave adapter and cannot pass into the air gap 6 after the wave adapter's insertion into the opening 16 of the waveguide 1. This makes possible an improved level meter, with a hollow guide 11 such that a hollow conductor wave propagates through the metallic hollow conductor, to then pass through the wave adapter, particularly a ceramic cone acting as wave adapter, and into an adjacent body or into open space at the front of the level meter. The wave adapter is metallized over a longer portion of its circumference in order to give the hollow waveguide a clearly delimited geometry in this area. The metallized part on the circumference of both the cylindrical and the conical areas of the ceramic cone that forms the wave adapter is intended to assure that a gap 6, with its disruptive effect, does not form between the ceramic part of the wave adapter and the metal wall of the waveguide or of the waveguide housing. This arrangement prevents or diminishes a disruption of the microwave signal in its propagation through an undefined gap, also referred to as a choke. With the reduction or prevention of the wave transition in the area of the gap 6 an undisturbed wave is transmitted, or a reflected wave is received, through the gap 6 without a disruption, and an improved measurement of the level of fill is provided. To further improve the transition from the air/hollow conductor 11 into the ceramic cone of the wave adapter, or vice versa, a contact ring, specifically the contact ring 41 or 40, can be positioned on the ceramic conductor in the area of the transition from the metallic hollow conductor to the ceramic conductor. Graphite is an especially preferred material for the contact ring. The rear contact ring 41 provides a particularly good electrical contact between the metal, specifically the high-grade steel, of the waveguide 1, and the metallized part 23 on the wave adapter 2. A graphite ring serving as contact ring 41 will also check the elongation of materials, as caused by temperature differences arising during operation. The front contact ring will preferably consist of metal, particularly high-grade steel, with the result that it can be soldered onto the metallized part 23 of the wave adapter 2 with particular ease. This also permits use at high temperatures and/or high pressure and/or when there is a chemically aggressive environment present in front of the level meter.

In the preferred embodiment a metallized part (in itself known to the prior art) in the area of contact with the soldered ring is widened beyond this area over the circumference of the wave adapter, so that the enlarged area provides the hollow conductor with a defined outside wall. This permits a simplified manufacturing process for the components made of metal, since the metallic components in the conical area do not have be produced with a very narrow tolerance. A further advantage rests in the fact that a disruptive gap 6, which acting as a choke could disrupt the propagation of the microwave signal, is not formed between the wave adapter of ceramic and the waveguide of metal. Yet another advantage rests in the fact that an electrical contact between the wave adapter with the metallized part 23 and the hollow conductor 11 made of metal can be formed by a graphite ring serving as a further contact ring 41.

A number of alternative configurations can be realized. For example, the wave adapter 2 can be adapted to the given conditions with respect to its shape and dimensions. Furthermore, the metallized part 23 can extend over the wave adapter 2 to a greater or lesser degree, according to the given circumstances. In the addition to the preferred embodiment, with the wave adapter exhibiting a forward, non-metallized conical section 21, embodiments are possible in which there is a partial or complete metallization of this section. The rear section 22 of the wave adapter 2 can also be metallized to a greater or lesser degree, according to the dimensions of the level gauge and its applications. Metallization is understood to mean not only a metal layer applied directly to the material, particularly the ceramic material, of the wave adapter, but also to mean an independent metallic body which rests tightly against the actual material of the wave adapter 2. In addition the cross-section of the waveguide 1 and the wave adapter 2 does not have to be restricted to a circular one.

The invention claimed is:

1. Level meter comprising:
    a waveguide for guiding an electromagnetic wave, such that the waveguide is designed as a hollow conductor and has a terminal section;
    a wave adapter of a dielectrical material, such that the wave adapter has an outer circumferential area and partially projects with this outer circumferential area into a hole in the terminal section of the waveguide and partially protrudes from this terminal section, and such that the wave adapter has dimensions that allow it to adapt the wave transition of a wave leaving or entering the terminal section of the waveguide; and
    a metallized part comprising a metallic transitional material in an area between the wave adapter and the waveguide,
    wherein
    the metallized part extends over an area greater than an area of direct contact between the outer circumference of the wave adapter and the waveguide.

2. Level meter according to claim 1, wherein the metallized part running over the outer circumferential area of the wave adapter reaches a certain distance into the area of the waveguide.

3. Level meter according to claim 1, wherein the metallized part running over the outer circumference of the wave adapter reaches into the waveguide up to a terminal section of the wave adapter that is unmetallized.

4. Lever meter according to claim 1, wherein the wave adapter has a conical shape as it enters the waveguide.

5. Lever meter according to claim 1, wherein a section of the wave adapter projecting out of the terminal section of the waveguide projects into an antenna, particularly a horn antenna.

6. Level meter according to claim 1, wherein the metallized part extends in a wave's direction of propagation along the wave adapter a distance such that the electromagnetic wave proceeding from the waveguide or from the wave adapter cannot penetrate into a gap between the wave adapter and the waveguide and into the area of direct contact between the outer circumference of the wave adapter and the waveguide or into an area adjacent to the area of direct contact between the outer circumference of the wave adapter and the waveguide.

7. Level meter according to claim 1, wherein an electromagnetically conductive contact ring is positioned in the area of direct contact between the outer circumference of the wave adapter and the waveguide, and the contact ring is welded to the metallized part.

8. Level meter according to claim 1, wherein an electromagnetically conductive contact ring is positioned in the terminal area of the metallized part between the wave adapter and the waveguide.

9. Level meter according to claim 7, wherein the contact ring is made of a material with a metal or graphite content.

10. Level meter according to claim 7, wherein the wave adapter has a cylindrical outer diameter in the area beneath the contact ring.

11. Level meter according to claim 1, wherein the waveguide is formed by a hollow conductor and a housing positioned in front of it, for the purpose attaching an antenna and/or for the purpose of securing the configuration into the hole of a container wall, where the wave adapter projects, at least in part, from the area of the housing on both sides.

12. Wave adapter, specifically for a level meter according to claim 1, consisting of a dielectrical material for adapting a wave in the transitional area between a waveguide and a bordering space and/or bordering body, wherein a metallized part extends beyond an area of direct contact with the waveguide.

* * * * *

UNITED STATES PATENT AND TRADEMARK OFFICE
CERTIFICATE OF CORRECTION

PATENT NO. : 7,322,233 B2  Page 1 of 1
APPLICATION NO. : 11/179783
DATED : January 29, 2008
INVENTOR(S) : J. Fehrenbach et al.

It is certified that error appears in the above-identified patent and that said Letters Patent is hereby corrected as shown below:

Column 6, Line 55,
Please delete "and/or"
and
replace with
-- or --

Signed and Sealed this

Fifteenth Day of April, 2008

JON W. DUDAS
*Director of the United States Patent and Trademark Office*